United States Patent
Garcia et al.

(10) Patent No.: US 10,198,486 B2
(45) Date of Patent: Feb. 5, 2019

(54) RECOMMENDATION FILTERING BASED ON COMMON INTERESTS

(75) Inventors: Edward O'Neil Garcia, Redwood City, CA (US); Allison Bhusri, San Francisco, CA (US); Cyn Skyberg, Campbell, CA (US); William R Watt, II, San Jose, CA (US)

(73) Assignee: eBay Inc., San Jose, CA (US)

( * ) Notice: Subject to any disclaimer, the term of this patent is extended or adjusted under 35 U.S.C. 154(b) by 419 days.

(21) Appl. No.: 13/539,379

(22) Filed: Jun. 30, 2012
(Under 37 CFR 1.47)

(65) Prior Publication Data
US 2014/0006389 A1    Jan. 2, 2014

(51) Int. Cl.
| G06F 17/30 | (2006.01) |
| G06Q 30/02 | (2012.01) |
| G06Q 30/06 | (2012.01) |
| G06Q 50/00 | (2012.01) |

(52) U.S. Cl.
CPC .. G06F 17/30554 (2013.01); G06F 17/30867 (2013.01); G06Q 30/0201 (2013.01); G06Q 30/0251 (2013.01); G06Q 30/0631 (2013.01); G06Q 50/01 (2013.01)

(58) Field of Classification Search
CPC ......... G06F 17/30864; G06F 17/30867; G06F 17/2247; G06F 17/30917; G06F 17/30554; G06Q 30/0601; G06Q 30/02; G06Q 30/0282
USPC ..................................... 707/722, 723; 705/1
See application file for complete search history.

(56) References Cited

U.S. PATENT DOCUMENTS

| 2,465,971 A | 3/1949 | Leblang |
| 2,931,657 A | 4/1960 | Lewis |
| 3,252,243 A | 5/1966 | Doyle et al. |
| 3,717,942 A | 2/1973 | Presby |
| 5,605,332 A | 2/1997 | Harnett |
| 6,146,721 A | 11/2000 | Freynet |

(Continued)

OTHER PUBLICATIONS

"AgingBooth—Android Apps on Google Play", [Online]. Retrieved from the Internet: <URL: https://play.google.com/store/apps/details?id=com.piviandco.agingbooth&hl=en>, (Accessed May 3, 2013), 2 pgs.

(Continued)

Primary Examiner — Syling Yen
(74) Attorney, Agent, or Firm — Schwegman Lundberg & Woessner, P.A.

(57) ABSTRACT

A method, system, and article of manufacture comprising tabulating, for a plurality of users making recommendations, information including respective user interests and recommendations, storing the tabulated information in a database, responsive to a query from a client machine, the query seeking a recommendation from a user having a particular user interest, filtering the stored tabulated information to determine recommendations from users having the particular user interest, and presenting the recommendations to the client machine. Also included is a community of parents who are registered on one site to find on other sites products that they are curious about or want to give feedback on, and then collect those items and share insights or request guidance from at least some of the individual parents in the community.

20 Claims, 11 Drawing Sheets

(56) References Cited

U.S. PATENT DOCUMENTS

| | | | |
|---|---|---|---|
| 6,195,657 B1* | 2/2001 | Rucker | G06F 17/3061 |
| | | | 707/731 |
| 6,244,926 B1 | 6/2001 | George et al. | |
| 6,567,797 B1 | 5/2003 | Schuetze et al. | |
| 7,143,089 B2 | 11/2006 | Petras et al. | |
| 7,363,214 B2 | 4/2008 | Musgrove et al. | |
| 7,519,562 B1 | 4/2009 | Vander Mey et al. | |
| 7,568,004 B2 | 7/2009 | Gottfried | |
| 7,587,359 B2 | 9/2009 | Levy et al. | |
| 7,689,916 B1 | 3/2010 | Goel et al. | |
| 7,712,035 B2 | 5/2010 | Giannini | |
| 7,752,082 B2 | 7/2010 | Calabria | |
| 7,756,757 B1 | 7/2010 | Oakes, III | |
| 7,761,339 B2 | 7/2010 | Alivandi | |
| 7,827,074 B1 | 11/2010 | Rolf | |
| 7,878,891 B2 | 2/2011 | Chiu | |
| 8,127,253 B2 | 2/2012 | Sauve et al. | |
| 8,280,959 B1 | 10/2012 | Zuckerberg et al. | |
| 8,628,087 B2 | 1/2014 | Knowlton et al. | |
| 9,524,487 B1* | 12/2016 | Yagnik | G06Q 30/00 |
| 2001/0044751 A1 | 11/2001 | Pugliese, III et al. | |
| 2002/0002504 A1 | 1/2002 | Engel et al. | |
| 2002/0055868 A1 | 5/2002 | Dusevic et al. | |
| 2003/0028873 A1 | 2/2003 | Lemmons | |
| 2006/0058948 A1 | 3/2006 | Blass et al. | |
| 2006/0149625 A1 | 7/2006 | Koningstein | |
| 2006/0218153 A1 | 9/2006 | Voon et al. | |
| 2007/0143128 A1* | 6/2007 | Tokarev | G06Q 10/10 |
| | | | 705/347 |
| 2007/0198505 A1 | 8/2007 | Fuller | |
| 2007/0220540 A1 | 9/2007 | Walker et al. | |
| 2007/0288468 A1 | 12/2007 | Sundaresan et al. | |
| 2008/0046956 A1 | 2/2008 | Kulas | |
| 2008/0077473 A1 | 3/2008 | Allin-Bradshaw et al. | |
| 2008/0162157 A1 | 7/2008 | Daniluk | |
| 2008/0176545 A1 | 7/2008 | Dicke et al. | |
| 2008/0186226 A1 | 8/2008 | Ratnakar | |
| 2008/0208852 A1* | 8/2008 | Kuttikkad et al. | 707/6 |
| 2008/0285940 A1 | 11/2008 | Kulas | |
| 2009/0006208 A1 | 1/2009 | Grewal et al. | |
| 2009/0019487 A1 | 1/2009 | Kulas | |
| 2009/0083096 A1 | 3/2009 | Cao et al. | |
| 2009/0115777 A1 | 5/2009 | Reyers Moreno | |
| 2009/0144624 A1 | 6/2009 | Barnes, Jr. | |
| 2009/0228342 A1 | 9/2009 | Walker et al. | |
| 2009/0258687 A1 | 10/2009 | Weichselbaum | |
| 2009/0265639 A1 | 10/2009 | Shuster | |
| 2009/0271293 A1 | 10/2009 | Parkhurst et al. | |
| 2009/0299819 A1 | 12/2009 | Davis, III et al. | |
| 2009/0299824 A1 | 12/2009 | Barnes, Jr. | |
| 2009/0319373 A1 | 12/2009 | Barrett | |
| 2009/0319436 A1 | 12/2009 | Andra et al. | |
| 2010/0049663 A1 | 2/2010 | Kane, Jr. et al. | |
| 2010/0070382 A1 | 3/2010 | Inghelbrecht et al. | |
| 2010/0094729 A1 | 4/2010 | Gray et al. | |
| 2010/0145719 A1 | 6/2010 | Williams et al. | |
| 2010/0145790 A1 | 6/2010 | Brignull et al. | |
| 2010/0153378 A1 | 6/2010 | Sardesai | |
| 2010/0211900 A1 | 8/2010 | Fujioka | |
| 2010/0268661 A1 | 10/2010 | Levy et al. | |
| 2010/0332283 A1 | 12/2010 | Ng et al. | |
| 2011/0004517 A1 | 1/2011 | Soto et al. | |
| 2011/0035295 A1 | 2/2011 | Lifson | |
| 2011/0040602 A1 | 2/2011 | Kurani | |
| 2011/0078055 A1 | 3/2011 | Faribault et al. | |
| 2011/0078305 A1 | 3/2011 | Varela | |
| 2011/0106589 A1 | 5/2011 | Blomberg et al. | |
| 2011/0153451 A1 | 6/2011 | Bitz et al. | |
| 2011/0173191 A1 | 7/2011 | Tsaparas et al. | |
| 2011/0184780 A1 | 7/2011 | Alderson et al. | |
| 2011/0246329 A1 | 10/2011 | Geisner et al. | |
| 2012/0022978 A1 | 1/2012 | Manea et al. | |
| 2012/0084812 A1 | 4/2012 | Thompson et al. | |
| 2012/0116905 A1* | 5/2012 | Futty et al. | 705/26.1 |
| 2012/0197764 A1 | 8/2012 | Nuzzi et al. | |
| 2012/0239513 A1 | 9/2012 | Oliver et al. | |
| 2012/0265635 A1 | 10/2012 | Forsblom | |
| 2012/0313969 A1 | 12/2012 | Szymczyk et al. | |
| 2013/0071816 A1 | 3/2013 | Singh et al. | |
| 2013/0085792 A1 | 4/2013 | Klein | |
| 2013/0132221 A1 | 5/2013 | Bradford et al. | |
| 2013/0185679 A1 | 7/2013 | Fretwell et al. | |
| 2013/0191723 A1* | 7/2013 | Pappas et al. | 715/234 |
| 2013/0198002 A1 | 8/2013 | Nuzzi et al. | |
| 2013/0244784 A1 | 9/2013 | Assa | |
| 2013/0318180 A1* | 11/2013 | Amin | H04L 65/403 |
| | | | 709/206 |
| 2014/0176565 A1 | 6/2014 | Adeyoola et al. | |
| 2014/0213333 A1 | 7/2014 | Hanes et al. | |
| 2014/0282114 A1 | 9/2014 | Walkin et al. | |
| 2015/0024840 A1 | 1/2015 | Poon et al. | |

OTHER PUBLICATIONS

"U.S. Appl. No. 13/011,324, Response filed Aug. 19, 2013 to Non Final Office Action dated Apr. 18, 2013", 15 pgs.

"U.S. Appl. No. 13/011,324, Advisory Action dated Feb. 28, 2014", 3 pgs.

"U.S. Appl. No. 13/011,324, Appeal Brief filed Aug. 22, 2014", 19 pgs.

"U.S. Appl. No. 13/011,324, Final Office Action dated Nov. 22, 2013", 16 pgs.

"U.S. Appl. No. 13/011,324, Non Final Office Action daterd Apr. 18, 2013", 17 pgs.

"U.S. Appl. No. 13/011,324, Response filed Jan. 22, 2014 to Final Office Action dated Nov. 22, 2013", 15 pgs.

"U.S. Appl. No. 13/341,978, Non Final Office Action dated Jun. 30, 2014", 12 pgs.

"U.S. Appl. No. 13/341,978, Response filed Sep. 30, 2014 to Non Final Office Action dated Jun. 30, 2014", 13 pgs.

"U.S. Appl. No. 13/359,630, Non Final Office Action dated Jun. 7, 2013", 23 pgs.

"U.S. Appl. No. 13/359,630, Response filed May 21, 2013 to Restriction Requirement dated Apr. 29, 2013", 10 pgs.

"U.S. Appl. No. 13/359,630, Restriction Requirement dated Apr. 29, 2013", 6 pgs.

"Draw Something", [Online]. Retrieved from the Internet: <URL: http://omgpop.com/drawsomething>, (Accessed May 3, 2013), 1 pg.

"Exquisite Corpse", Wikipedia, [Online]. Retrieved from the Internet: <URL: http://en.wikipedia.org/wiki/Exquisite_corpse>, (Accessed Jun. 11, 2014), 3 pgs.

"Facebook Gives Politico Access to Your Political Beliefs", © 2012 Ology, [online]. Retrieved from the Internet: <URL: http://www.ology.com/post/51413/facebook-gives-politico-access-to-your-political-beliefs>, (Accessed Jun. 28, 2012), 4 pgs.

Newby, Joe, "Facebook, Politico to meansrue sentiment of GOP candidates by collecting posts", © 2006-2012 Clarity Digital Group LLC d/b/a Examiner.com., [online]. Retrieved from the Internet: <URL: http://www.examiner.com/computer-user-in-national/facebook-to-measure-sentiment-of-gop-candidates-by-collecting-users-posts>, (Accessed Jun. 28, 2012), 3 pgs.

Sifry, Micah L, "Politico-Facebook Sentiment Analysis Will Generate Bogus Results, Expert Says", © 2012 Personal Democracy Media., [online]. Retrieved from the Internet: <URL: http://techpresident.com/news/21618/politico-facebook-sentiment-analysis-bogus>, (Jan. 13, 2012), 3 pgs.

"U.S. Appl. No. 13/011,324, Examiner's Answer dated Nov. 28, 2014", 18 pgs.

"U.S. Appl. No. 13/011,324, Non Final Office Action dated Mar. 10, 2015", 19 pgs.

"U.S. Appl. No. 13/341,978, Non Final Office Action dated Dec. 29, 2014", 15 pgs.

"U.S. Appl. No. 13/946,584, Non Final Office Action dated Apr. 9, 2015", 12 pgs.

"U.S. Appl. No. 13/341,978, Advisory Action dated Feb. 19, 2016", 3 pgs.

(56) References Cited

OTHER PUBLICATIONS

"U.S. Appl. No. 13/341,978, Response filed Dec. 23, 2015 to Final Office Action dated Jul. 24, 2015", 18 pgs.
"U.S. Appl. No. 13/011,324, Amendment filed Jan. 28, 2015", 32 pgs.
"U.S. Appl. No. 13/011,324, Final Office Action dated Sep. 30, 2015", 24 pgs.
"U.S. Appl. No. 13/011,324, Response filed Jun. 10, 2015 to Non Final Office Action dated Mar. 10, 2015", 27 pgs.
"U.S. Appl. No. 13/341,978, Final Office Action dated Jul. 24, 2015", 19 pgs.
"U.S. Appl. No. 13/341,978, Response filed Apr. 29, 2015 to Non Final Office Action dated Dec. 29, 2014", 31 pgs.
"U.S. Appl. No. 13/946,584, Response filed Aug. 10, 2015 to Non Final office Action dated Apr. 9, 2015", 19 pgs.
"U.S. Appl. No. 13/341,978, Non Final Office Action dated Feb. 8, 2017", 20 pgs.
"U.S. Appl. No. 13/341,978, Examiner Interview Summary dated Mar. 15, 2017", 3 pgs.
"U.S. Appl. No. 13/341,978, Response filed May 8, 2017 to Non Final Office Action dated Feb. 8, 2017", 10 pgs.

\* cited by examiner

RECOMMENDATION FILTERING BASED ON COMMON INTERESTS

BACKGROUND

Applications available on the Internet have progressed from facilitating a medium of information delivery to a venue for sales and, more recently, to a platform for social networking. An online marketplace such as eBay.com is an example of an online seller. Similarly, Facebook.com is an example of social networking.

TECHNICAL FIELD

The subject matter disclosed herein generally relates to the processing of data. Specifically, the present disclosure addresses systems and methods of providing content generated by a user of an ecommerce network for social network platform integration.

BRIEF DESCRIPTION OF THE DRAWINGS

Some embodiments are illustrated by way of example and not limitation in the figures of the accompanying drawings in which.

DETAILED DESCRIPTION

Figure 1:
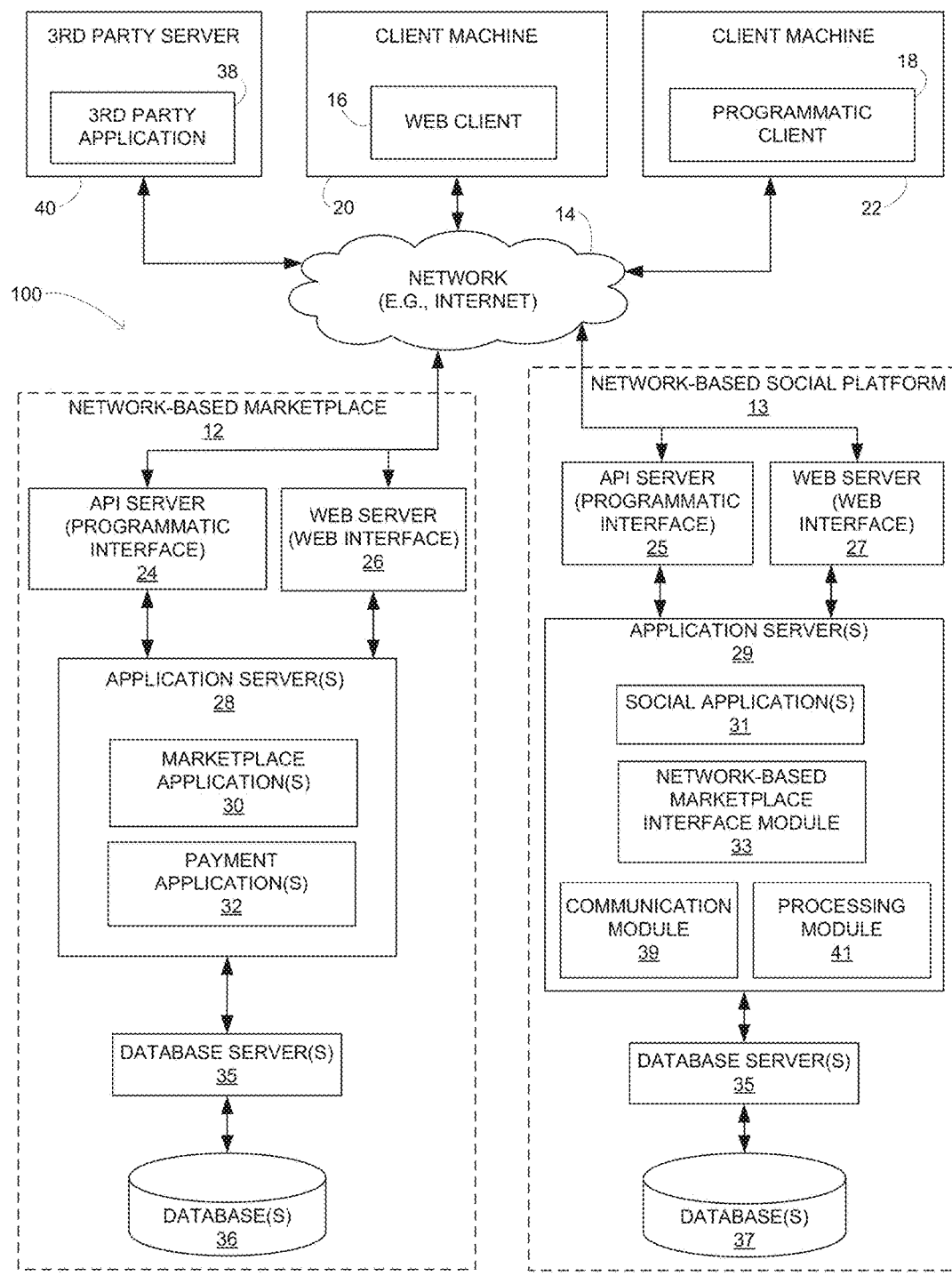
FIG. 1 is a network diagram depicting a system, according to one example embodiment, having a client-server architecture.

In the following description, for purposes of explanation, numerous specific details are set forth in order to provide embodiments of the subject matter of the present disclosure. It will be evident, however, to one skilled in the art that the present disclosure may be practiced without these specific details.

Content may be provided over a network from a first server to a second server. The first server may be, e.g., a web server, a database server, or a listing server. For example, a network-based publication system may include a first web server that provides content over a network to the second web server. Specifically, the second server may be a third-party social network server that provides a social networking service (e.g., Facebook®) to millions of users and provides social network data.

Each of the first server and second server may provide the content to one or more client machines, which client machines may be the same client machine or a different client machine.

A client machine may be a computer, a mobile device, or other machine functioning, temporarily or permanently, as a client in relation to the content machine. For example, the client machine may, as indicated above, have a user. The user may be a human user or a machine-implemented user (e.g., software executing on the client machine). The content provided by the social network server may be presented to a client machine and thence to the user by the client machine. Other couplings between these or similar servers and one or more client machines may be used.

In some example embodiments, a system and method for sharing product, shopping or other information on a network-based publication system such as an ecommerce system or a social system is illustrated. A request may be received from a first user of a client machine to such a network-based publication system for a product recommendation from one or more second users of the same or a different network-based publication system. For example, the first user may be using an ecommerce network, and some or all of the second users may be using a social platform. One or more of the users may be using a review or recommendation site. Other examples of the parties and the networked-based publication systems may be used. The recommendation may be, for example, for an item that may be listed for sale on a network-based marketplace. For example, a predetermined agreement for providing and receiving recommendations may have been consensually established by the first user and the second users by, in one example, by an opt-in process. The system may communicate the request to the second users who may provide one or more product recommendations. The users providing the recommendations may be using a product recommendation site or a product review site. However, it is difficult to quickly and easily determine the bias or perspective of a user who is making the recommendation. But determination of a user's bias or perspective is important in ascertaining the credibility of the recommendation. On a review site or a social network, each user may be prompted to enter interest, purchased items, and other personal information in a user profile. Each such user may post comments, reviews, and product recommendations either of their own volition, or in response to another user's posts. In response to the first user's request for recommendation, which may include searching for posts or a request to see the most interesting posts, the system may filter or sort posts based on compatibility between the poster and the user. The compatibility may be determined based on data in each user's profile along with user actions taken on the site, such as following the same post, similar responses to a posed quest, similar purchase, and the like. The site may facility transactions based on the filtered recommendations, as more fully described below.

Platform Architecture

FIG. 1 is a network diagram depicting a system 100, according to one embodiment of the present disclosure, having a client-server and a peer-to peer architecture. The system 10 facilitates shopping activity, in the exemplary form of a network-based marketplace 12 and a network-based social platform 13 that communicate over a network 14. In one embodiment, the network-based marketplace 12 and the network-based social platform 13 communicate in peer-to peer architecture via programmatic interfaces. Further, the network-based marketplace 12 and the network-based social platform 13 respectively communicate in client-server architecture with clients. The network-based marketplace 12 provides server-side functionality, via the network 14 (e.g., the Internet), to the one or more client machines 20 and 22. Similarly, the network-based social platform 13 provides server-side functionality, via the network 14 (e.g., the Internet), to the one or more client machines 20 and 22. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based social platform 13, an application program interface (API) server 25 and a web server 27 are coupled to, and provide programmatic and web interfaces respectively to, one or more application servers 29. The application servers 29 may host one or more social applications 31 and a network-based marketplace interface module 33 that communicates with a communication module 39 and a processing module 41. The application servers 29 are, in turn, shown to be coupled to one or more database server(s) 35 that facilitate access to one or more database(s) 37.

The social applications 31 provide a number of social networking functions and services to users that access the network-based social platform 13. For example, the social applications 31 may enable a user to store information in a profile that may be viewed at the client machines 20, 22 and to selectively grant access to information that appears on the profile to other users who may also view the profile at their client machines 20, 22. The social applications 31 may provide criteria that may be employed by a user to grant various levels of access to various levels of users. For example, a first user may access profile information associated with a second user responsive to the first user achieving the status of "friend" in relation to a second user. A user may achieve the status of friend by accepting an invitation from another user or by sending a request to a user that subsequently grants the request.

The social applications 31 may further enable third-party service providers to add "applications" on the network-based social platform 13 that are utilized by users to interact with other users. For example, a network-based marketplace application may be added by a third-party service provider in the form of the network-based marketplace interface module 33, the communication module 39, and the processing module 41 that may provide market application services in the network-based social platform 13 environment and may communicate with the network-based marketplace 12.

In one embodiment, a request related to the marketplace application may be generally processed as follows. The request may originate at the client machines 20, 22 that communicate the request via programmatic or web interface services 25, 27 to the social applications 31 that, in turn, communicate the request to the network-based marketplace interface module 33 that, in turn, communicates the request to the communication module 39 and processing module 41 that process the request. Conversely, the communication module 39 and processing module 41 may respond to the social applications 31 via the network-based marketplace interface module 33. In some instances processing of the request may require communication with the network-based marketplace 12. In such instances the communication module 39 or the processing module 41 may communicate via the API server 25 with the network-based marketplace 12.

The network-based social platform 13 may be embodied as FACEBOOK® services, a social utility that connects people with friends and others who work, study and live around them provided by Facebook of Palo Alto, Calif.

The web client 16, it will be appreciated, in one embodiment accesses the various social applications 31 via the web interface supported by the web server 27. Similarly, the programmatic client 18 in one embodiment accesses the various services and functions provided by the social applications 31 via the programmatic interface provided by the API server 25.

Turning to the network-based marketplace 12, an application program interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database server(s) 35 that facilitate access to one or more databases 36.

The marketplace applications 30 provide a number of marketplace functions and services to users that access the network-based marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32, respectively, are shown in FIG. 1 to both form part of the network-based marketplace 12, it will be appreciated that, in alternative embodiments of the present disclosure, the payment applications 32 may form part of a payment service that is separate and distinct from the network-based marketplace 12. The network-based marketplace 12 may be embodied as eBay, the world's online marketplace, provided by eBay of San Jose, Calif.

Further, while the system 100 shown in FIG. 1 employs a client-server architecture and a peer-to-peer architecture, the present disclosure is of course not limited to such an architecture, and could equally well find application in any combination of client-server, distributed, or peer-to-peer, architecture systems. The various marketplace and payment applications 30 and 32 could also be implemented as stand-alone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings of items on the network-based marketplace 12 in an off-line manner, and to perform batch-mode communications between the programmatic client 18 and the network-based marketplace 12.

It will be appreciated that the marketplace applications 30, payment applications 32, social applications 31, the network-based marketplace interface module 33, the communication module 39 and the processing module 41 may execute on a single platform. Accordingly, in one embodiment, the aforementioned applications/modules may execute on the network-based marketplace 12 and in another embodiment the aforementioned applications/module may execute on the network-based social platform 13.

FIG. 1 also illustrates a third-party application 38, executing on a third-party server machine 40, as having programmatic access to the network-based marketplace 12 via the programmatic interface provided by the API server 24. For example, the third-party application 38 may, utilizing information retrieved from the network-based marketplace 12, support one or more features or functions on a website hosted by the third party. The third-party website may, for example, provide one or more promotional, marketplace or payment functions that are supported by the relevant applications of the network-based marketplace 12.

Social Platform Applications

Figure 2:
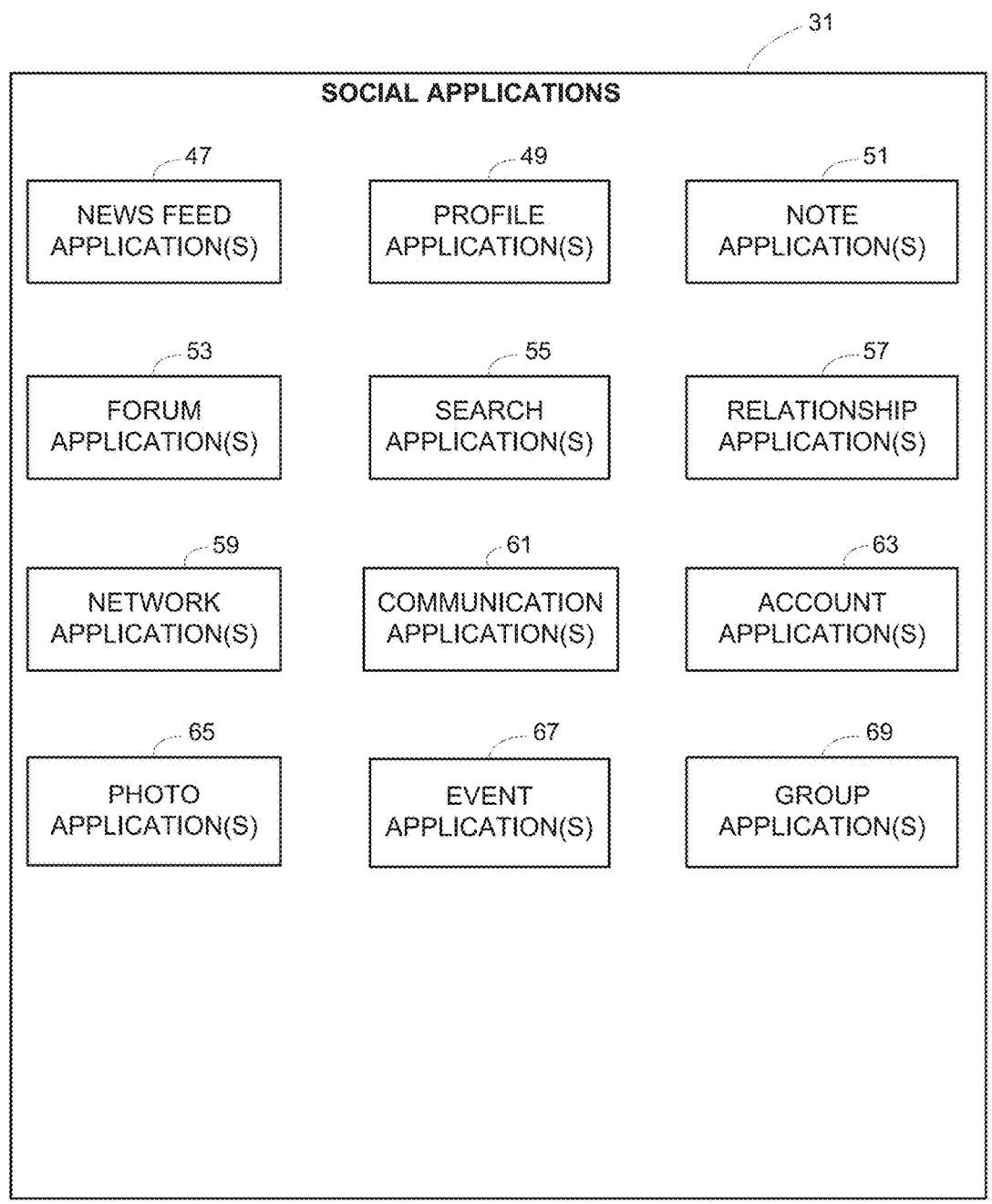
FIG. 2 is a block diagram illustrating social applications, according to an embodiment.

FIG. 2 is a block diagram illustrating applications that execute on the network-based social platform, according to an embodiment. The network-based social platform applications include news feed applications 47, profile applications 49, note applications 51, forum applications 53, search applications 55, relationship applications 57, network applications 59, communication applications 61, account applications 63, photo applications 65, event applications 67, and group applications 69.

The news feed applications 47 publish events associated with the user and friends of the user on the network-based social platform 13. The news feed applications 47 may publish the events on the user profile of a user. For example, the news feed applications 47 may publish the uploading of a photo album by one user on the user profile of the user and the user profiles of friends of the user.

The profile applications 49 may maintain user profiles for each of the users on the network-based social platform 13. Further, the profile applications 49 may enable a user to restrict access to selected parts of their profile to prevent viewing by other users. The note applications 51 may be used to author notes that may be published on various user interfaces.

The forum applications 53 may maintain a forum for users to post comments and display the forum via the profile associated with a user. The user may add comments to the forum remove comments from the forum and restrict visibility to other users. In addition, other users may post comments to the forum.

The search applications 55 may enable a user to perform a keyword search for users, groups, and events. In addition, the search applications 55 may enable a user to search for content (e.g. favorite movies) on profiles accessible to the user.

The relationship applications 57 may maintain relationship information for the users. The network applications 59 may facilitate the addition of social networks by a user, the social networks based on a school, workplace, or region or any social construct for which the user may prove an affiliation. The communication applications 61 may process incoming and outgoing messages, maintain an inbox for each user, facilitate sharing of content, facilitate interaction among friends (e.g., poking), process requests, process events, process group invitations and process communicating notifications.

The account applications 63 may provide services to facilitate registering, updating, and deleting user accounts. The photo applications 65 may provide services to upload photographs, arrange photographs, set privacy options for albums and tag photographs with text strings. The event applications 67 may provide services to create events, review upcoming events, and review past events. The group applications 69 may be used to maintain group information, display group information, and navigate to groups.

Figure 3:
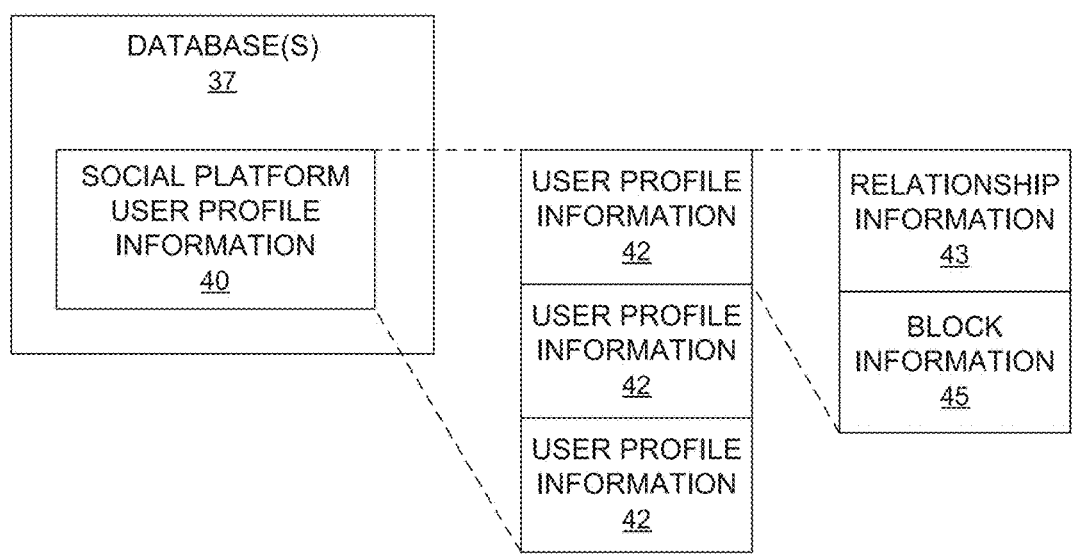
FIG. 3 is a block diagram illustrating a database, according to an embodiment.

FIG. 3 is a block diagram illustrating a database 37, according to an embodiment, at the network-based social platform 13 of FIG. 1. The database 37 is shown to include social platform user profile information 40 that stores user profile information 42 for each user on the network-based social platform 13. The user profile information 42 may include information related to the user and specifically may include relationship information 43 and block information 45. The relationship information 43 may store a predetermined relationship between the user associated with the user profile information 42 and other users on the network-based social platform 13. For example, a first user may be designated a "friend," or "favorite friend," etc. with a second user, the first user associated with the user profile information 42 and the respective designations associated with increasing levels of disclosure between the first user and second user. The block information 45 may store a configured preference of the user to block the addition of an item by other users to the watch list associated with the user.

Figure 3A:
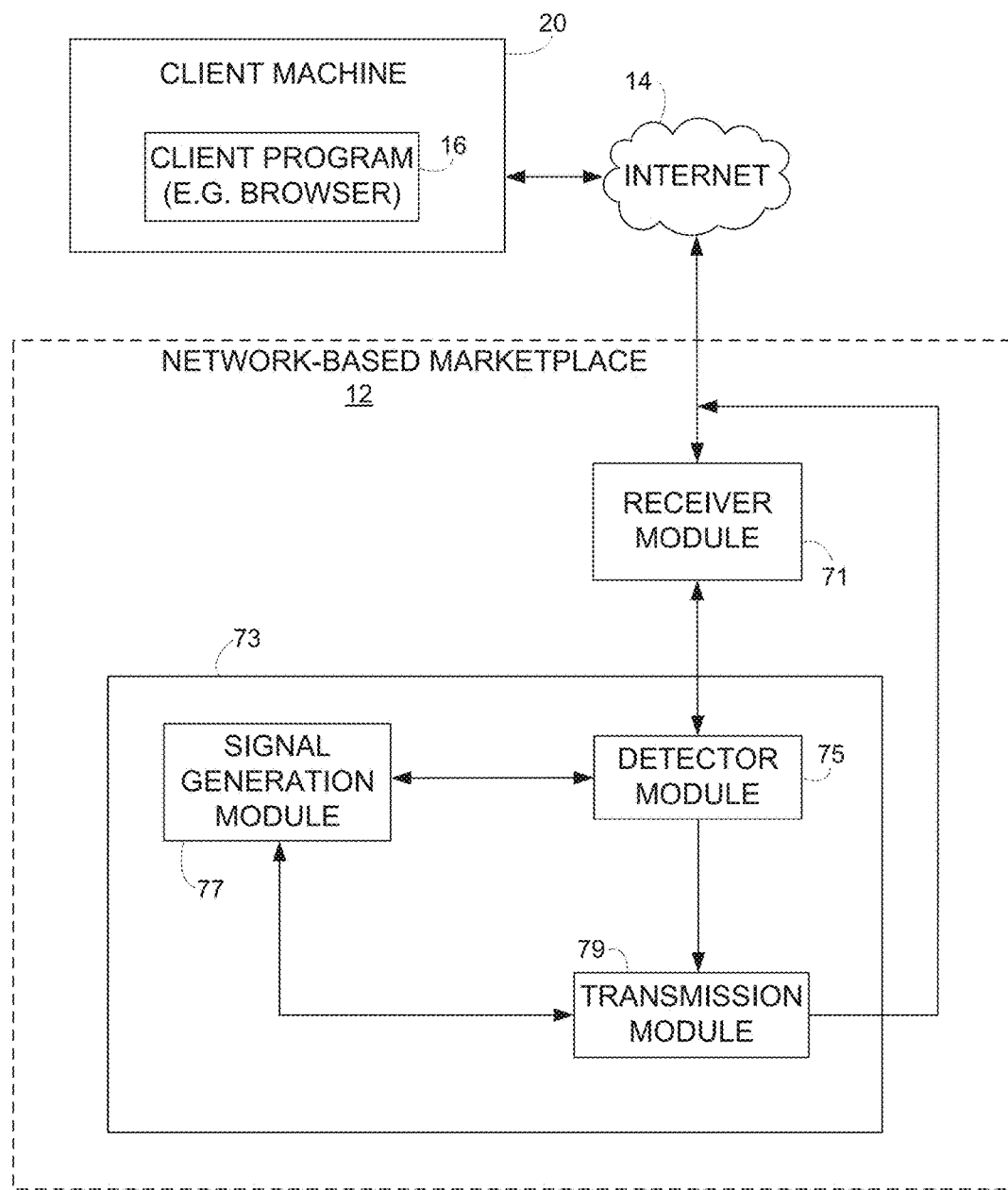
FIG. 3A is an illustration of a system usable with or as part of the system of FIG. 1.

Turning to FIG. 3A, there is seen a system that forms part of the transaction network-based marketplace 12 of FIG. 1. The network-based marketplace 12 is shown in part in the drawing to make it clear that the system forms only a part of the network-based marketplace 12. The system includes a receiver module 71 for receiving signals from client machine 20, the signals identifying content to be transmitted to a social network server for storing at a message space of a user of the social network server. As used herein, "signals" could mean analog signals or digital signals such as web-based messages, including packet-based messages, or even a request message via an API call. Also included is analysis module 73. Analysis module 73 includes detector module 75 responsive to the receiver module 71 for detecting the content, the identity of the social network, and the identity of the user of the social network. The analysis module 73 also includes a signal generation module 77 coupled to the detector module 75 responsive to the detection of signals such as, for example, signals identifying the content, the identity of the social network, and the identity of the user of the social network, for whom the content is intended, and other types of signals.

The signal generation module 77 can provide a rendering signal for rendering at least the content of the received signal. This rendering signal is transmitted by transmission module 79 via network 14 to a social network, not shown. Alternatively, instead of transmitting signals via the network to a social network server, the transmission module 79 may transmit the signals, either via the network 14 or internally to the network-based marketplace 12, to a social platform integrated within a network-based marketplace 12. Further, the signals from signal generation module 77 may include signals such as signals requesting a user of the social network for an opinion about the content, or for outfit suggestions about the content, among other things, as more fully discussed below.

Recommendations and Collections

An embodiment described is a social community website where parents share images, attribute tags and descriptions for products, gear and services. The site allows, in an example embodiment, parents to find products on other sites that they are curious about or want to give feedback on, and then "collect" those items and share insights or request guidance from the larger community. A user collects images by finding products on the Internet that they are interested in. They then use an "add it" button to grab the image, which puts them into a new "add item" screen. That is, the "add it" button may be a bookmarklet that the user drag and drop the toolbar of his or her browser. When the user finds a product he or she wants to add to their collections, the user clicks on the Add It button and it takes the user to a screen where the user can choose the image he or she wants to collect. For example, when the bookmarklet scrapes the page, it will grab every image on the page. This puts the user in an interstitial screen where they pick which images off that page they want to collect (there maybe be various sizes of the same image, or other undesirable images the users does not want, but the scraper grabs everything so the user makes the choice). That selection then dumps them into the "add item" screen. From there the user goes to the "add item" screen discussed below. At this point the user adds non-optional attributes (description, collection name) and optional attributes (gender or specific individual collected for, descriptor tags, recommendation). Users may register for the site via email or Facebook login, and are then prompted to fill out a profile. They are then able to start sharing their own items, or commenting on items others may have collected and posted to the site.

User Collections

Figure 4:
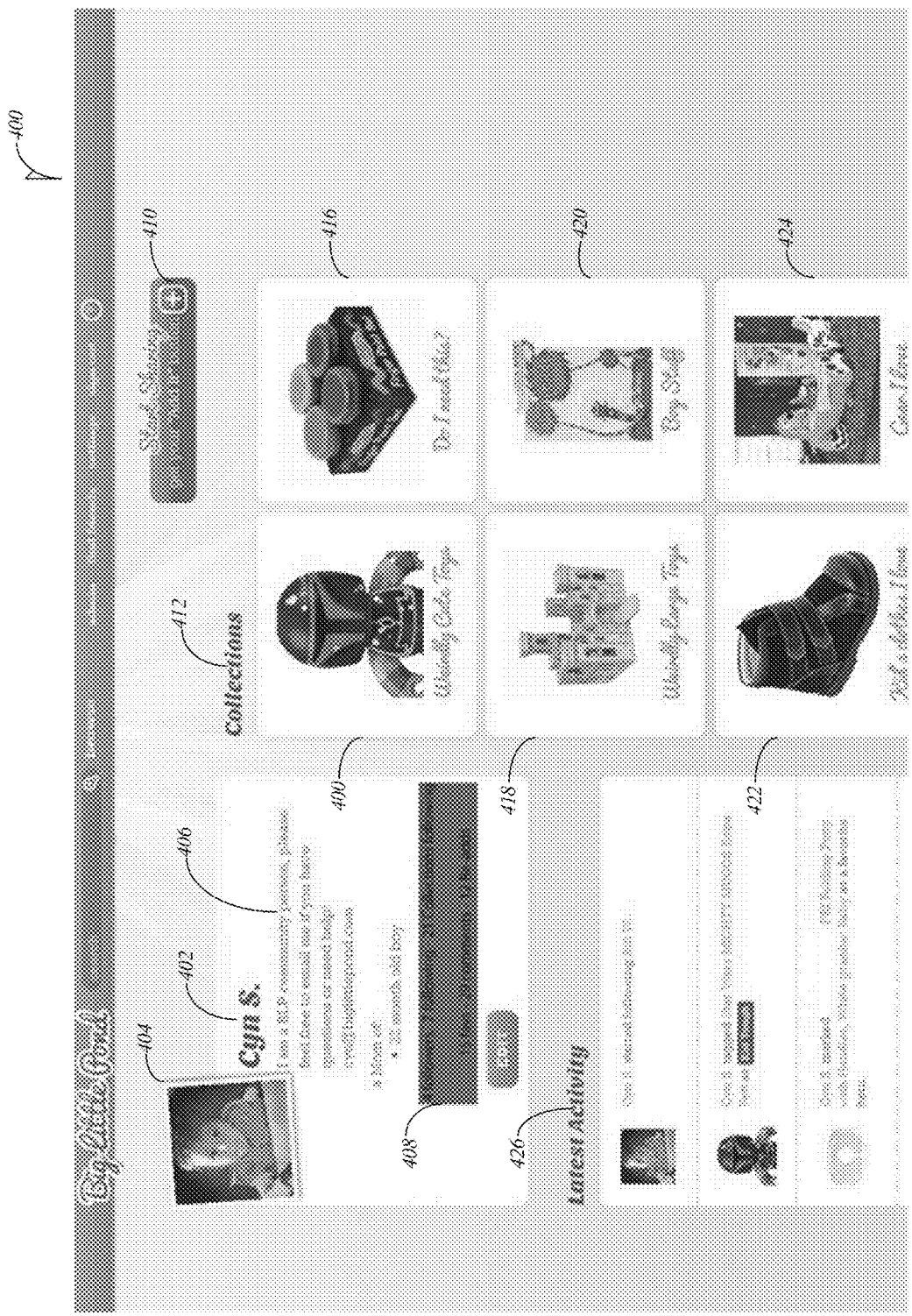
FIG. 4 is an illustration of a screen shot in accordance with an embodiment.

FIG. 4 illustrates a user's profile screen 400 that includes information from the user's profile. A user such as Cyn S. at 402, with a photograph of her son 404, and particulars from her profile as at 406, are illustrated. The user's profile page may also be populated with friends the user is following, with friends that are following the user, and with collections the user is following. When a user adds a friend the system may add the collections the friend is following. This can be added by auto-follow when the user adds someone as a friend. The user's latest activity in their feeds and their collections may also be stored in a database such as 37 in FIG. 1. The user may collect images by finding products on the Internet that they are interested in. They then use an "add it" button, which may obtained by selecting the "get your 'add it' button" icon 410, to grab the images, which puts the images into the "add item" screen of FIG. 5, discussed below. Users collect items into user-defined categories such as "Toys", "Games", "Clothing" or whatever they choose to name them. They may also choose a system defined, meta category, which may be mandatory.

In FIG. 4 the user, Cyn S., 402, has defined categories of collections shown as selectable icons such as "Weirdly Cute Toys" 414, "Do I need this?" 416 which may be articles are nice but perhaps unneeded, "Weirdly Large Toys" 418, and so on as further illustrated at 420, 422, and 424. When a user who selects 414, 416, . . . 424, the user is brought to the collection selected and the user can view the elements of those collections. Other categories may be added as discussed below with respect to FIGS. 5 and 6.

Figure 5:
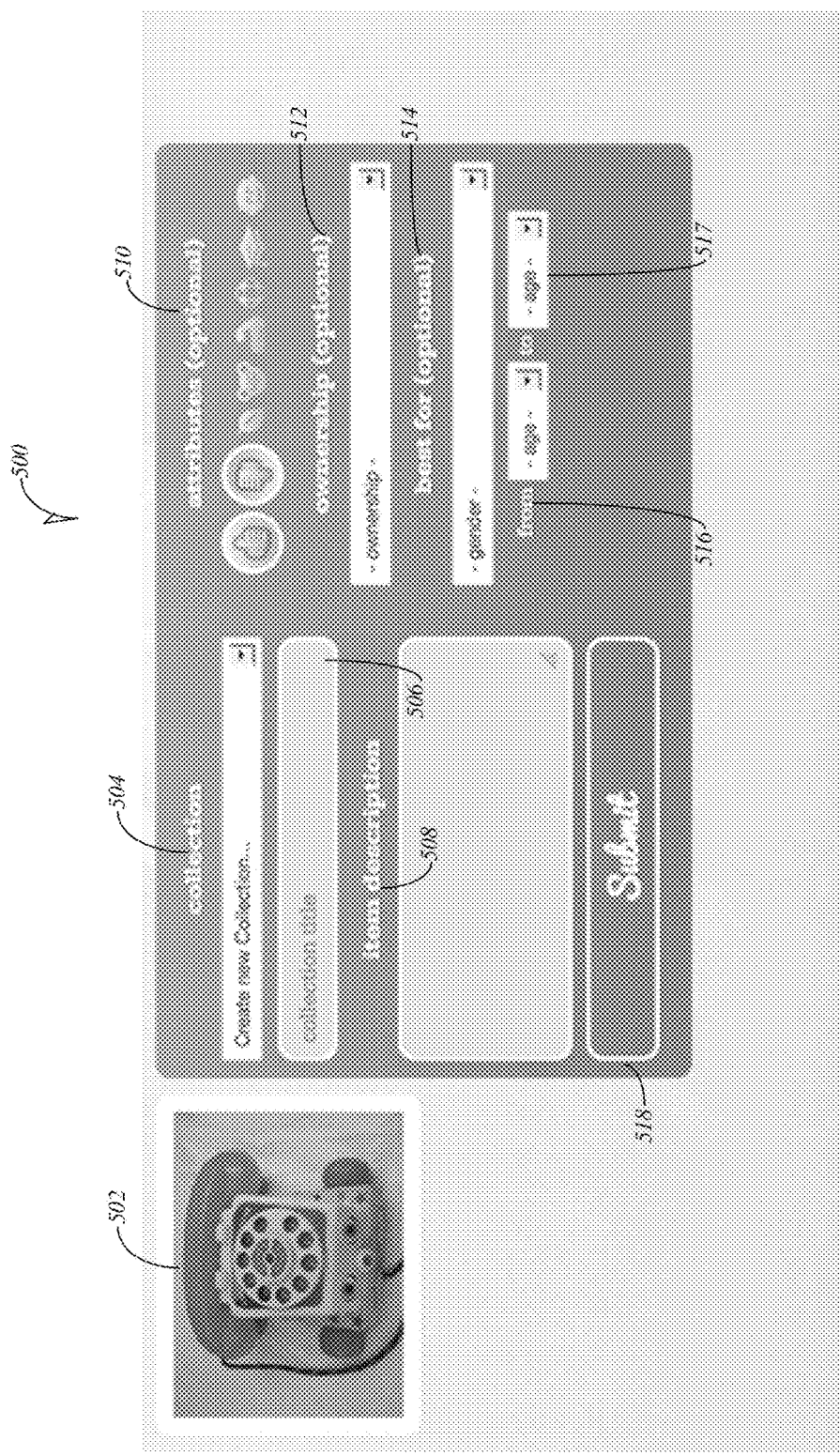
FIG. 5 is an illustration of a screen shot in accordance with an embodiment.
Figure 6:
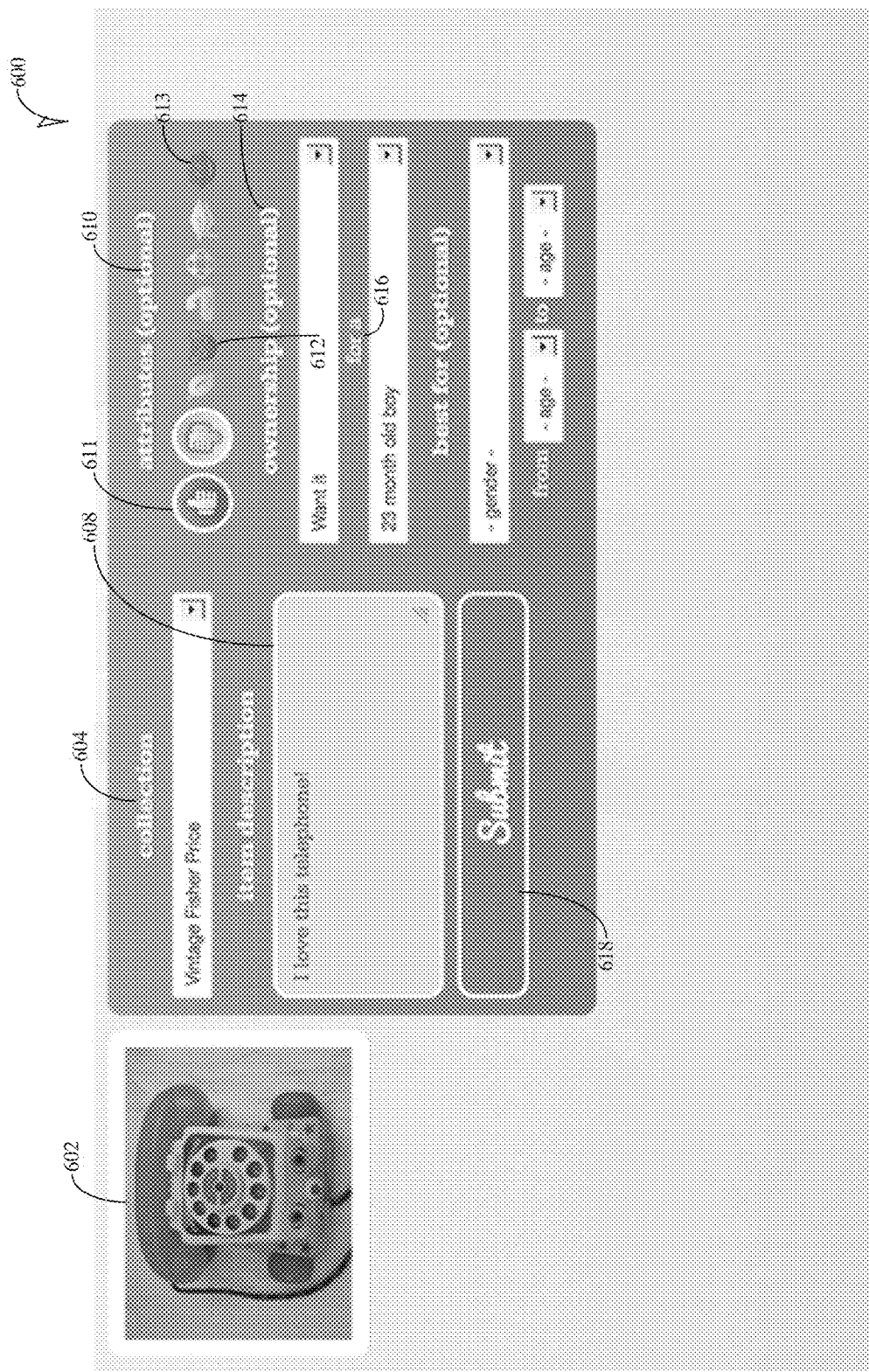
FIG. 6 is an illustration of a screen shot in accordance with an embodiment.

FIG. 5 illustrates an "add it" screen 500. Seen at 502 is a Fisher Price telephone that has been grabbed from the Internet as explained above. At this point the user may also add non-optional attributes (collection name 504, description 506) and optional attributes (gender or specific individual collected for, descriptor tags, recommendation) 508, 510, 512, 514, 516. Selectable attributes 510 may include, from left to right, "Like," "Dislike," "Cute", "Safety Conscious", "Kid-Approved" "Eco-Friendly", "Educational", and "Kid-Tough," respectively. The collection screen also allows the user to specifically collect items for individuals they have listed as family members, for example, at pull-down menu 514 in FIG. 5. When complete, the user selects submit 518. An example of a completed "add it" page is seen in FIG. 6 with reference numerals similar to the numerals of FIG. 5 except that the selection of attributes 510 of FIG. 5 are seen as attributes 611 (Like), 612 (Safety Conscious), and 613 (Kid Tough). These attributes may be viewed as an activity of the type discussed with respect to Table 2, below, the activity in this example is collecting children's toys that represent safety consciousness and are kid tough. The toy may be displayed as part of a collection indicated on the user's profile page such as at areas corresponding to areas 414, 416, . . . , and 424 of FIG. 4. This activity may be tabulated, stored in a database, and filtered in response to a query as discussed below with respect to FIGS. 7, 8, 8A and 8B, and presented to a querying user.

User Commentary

Users are able to comment on other user's items, and also tag them with a static set of attributes that includes item descriptors and tags explaining who the item is for, but also allows them to specifically collect items for individuals they have listed as family members as stated above.

Parents Like You

One embodiment may include a "Parents Like You" feature that may use a unique process to determine relevant recommendations for users on the site. Unlike other recommendation systems, the disclosed system will take into account several types of data to recommend items and people that are germane to a user's experience on the site in order to provide recommendation filtering based on common interests. The types of data that may be used to determine common interest may include:

TABLE 1

User profile
    Type of relative/individual listed (user can list their
    own children and other individuals they want to collect for)
    Gender of relative/individual
    Age of relative/individual (s)
    Age of user
    Partner/marital status
    Geography
    Friends in common
    Family member types
    Reputation level

TABLE 2

User activity
    Collections created (both number and key word)
    Items collected
    Category of items collected
    Attributes assigned most often (gender, age,
    kid-tough, kid approved, eco- friendly, educational,
    safety conscious, cute)
    Number of items commented
    Types of items commented on not in your collection
    Number of similar Items made Favorites
    Total number of items favorited by others
    Cumulative activity level comparison; the gross
    count of actions taken on the site
    relative to other users
    Types of questions most often asked
    Types of questions most often answered Target-Specific Collections Unlike usual wish lists, the disclosed system allows a first user to create collections specifically for individual users that the first user has listed on his or her profile. The collections are available to other users via the first user's profile. In one embodiment the first user creates a collection, names it as he or she wishes but, in one case, potentially for an event "Child's birthday." The first user collects items wanted for the event and attributes them to the individual the event or collection is for. The functions may include:

TABLE 3

The first user shares one or More collections to friends via email or Facebook.
    Other users can comment and attribute to that collection;
    The collections may also be used as a timeline of childhood events;
    A user may ask for specific contributions to an already defined concept
      (Ben's 3rd birthday; Items You Need to Have a Sleep Over, etc).

Description of Flow Charts

Figure 7:
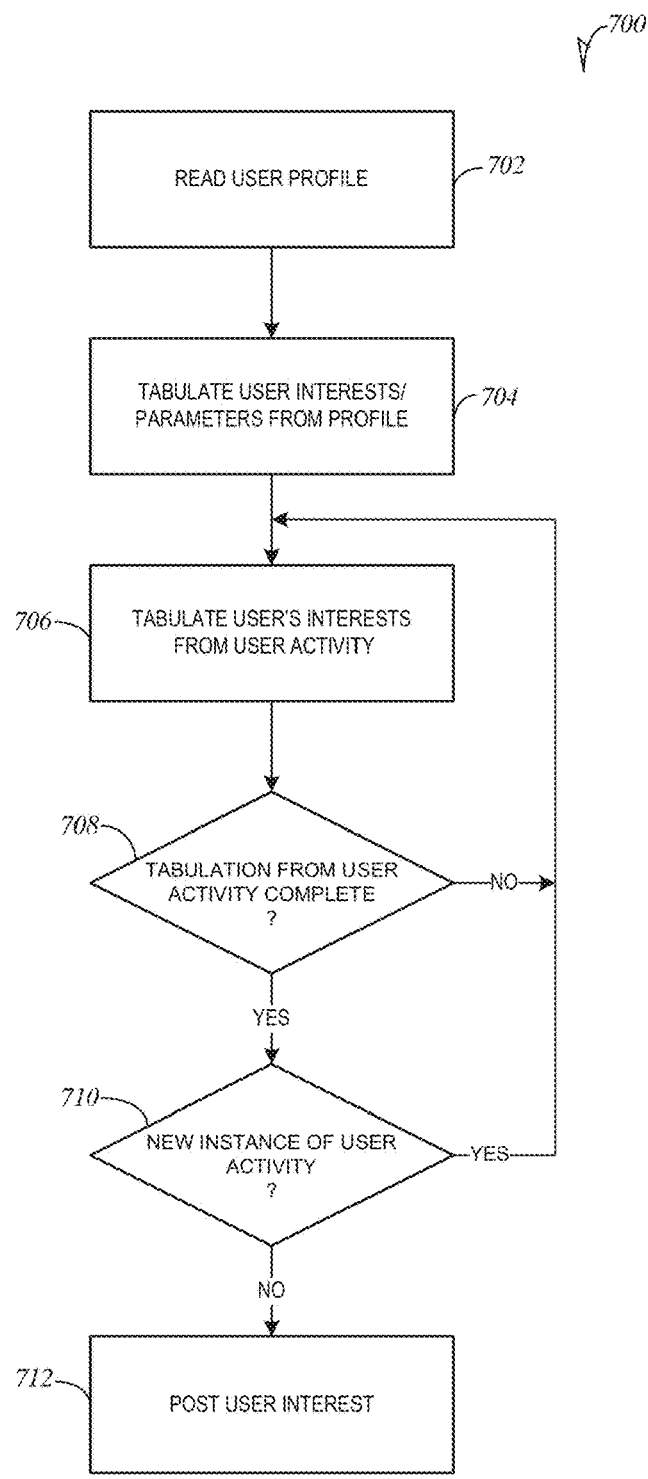
FIG. 7 illustrates a flow diagram explaining operation of an embodiment.

FIG. 7 is a flowchart illustrating method 700 for illustrating the interests of the first user who is providing recommendations so that a user who views the collections or other recommendations of the first user will understand the bias, perspective and/or interests of the first user. In this manner the user who views the recommendations of the first user may be able to determine whether and to what extent the first user and viewing user have common interest.

The method of FIG. 7 can be performed in any order, using the user profile information first, or using the user's activity first. In one embodiment the user profile is read at 702 and at 704 the user's interests, or in the case of profile, personal information (herein termed "parameters") are tabulated. This may be accomplished by using Table 1, above.

At 706 the user's interest from the user's activities, such as at Table 2, are tabulated. A decision is taken at 708 based on whether the tabulation from user activity is complete. If a No decision is reached, the method continues at 706. If a Yes decision is reached, then a decision is taken at 710 to determine whether there is a new instance, or occurrence, of any of the user's activities of Table 2 (as an example). If a Yes decision is taken, meaning that during the above tabulation new use activity has occurred, then that new user activity is entered into the tabulation at step 706. If a No decision is taken, then the user activity may be stored in database 37. In some embodiments, one or more of the activities may be posted at 408 of the user's profile, FIG. 4. The user who then views the first user's recommendations in FIG. 4 can determine from 408, in one embodiment, one or more of the user's biases, perspectives and interests in order to determine whether the recommendations of FIG. 4 is from a user who has common interests with the user who views the UI of FIG. 4. In another embodiment, the user seeking recommendations may use the method discussed with respect to FIGS. 8, 8A, and 8B.

Figure 8:
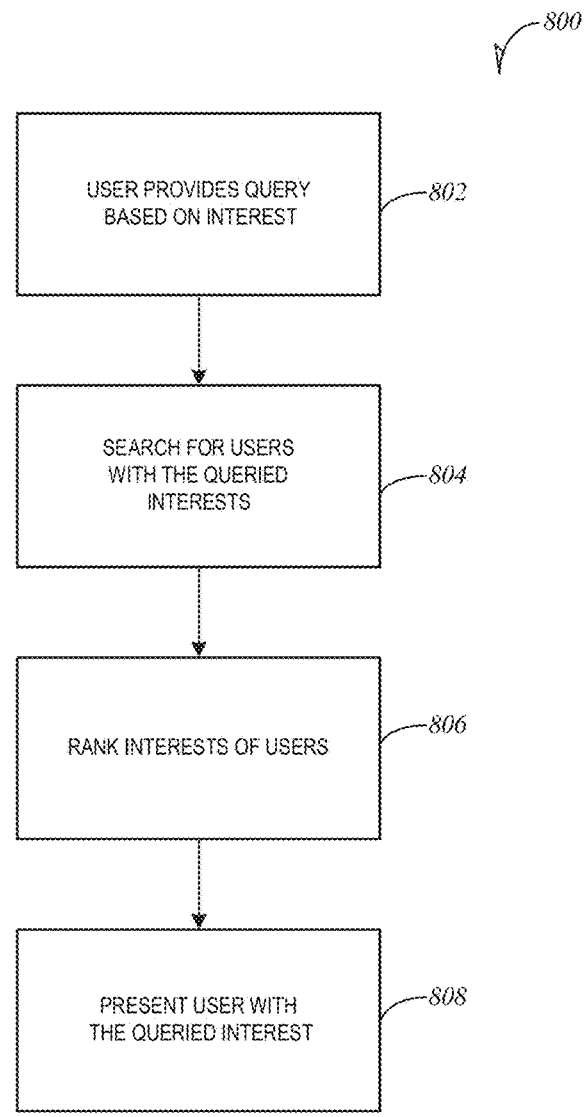
FIG. 8 illustrates another flow diagram explaining operation of an embodiment.
Figure 8A:
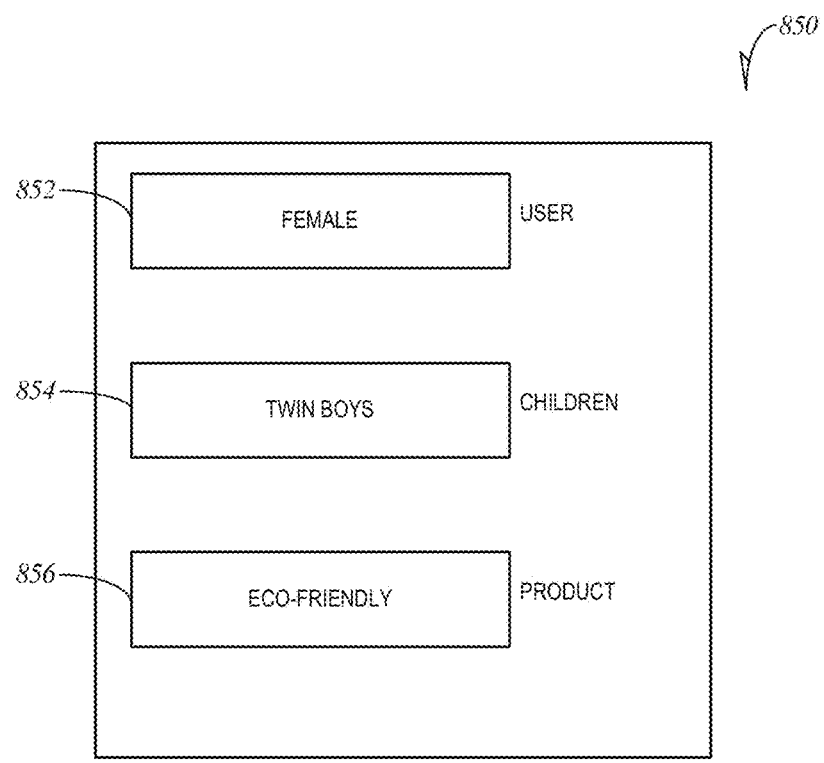

FIG. 8 illustrates a method useful in an embodiment for seeking users with particular interests, or seeking collections from users with particular interests. At 802 the user provides a query based on an interest. The system may store parameters and interests from Table 1 and Table 2 in database 37, categorized, for example, by each user who matches the parameters and/or interests and also, if desired, by collections made by users with the given parameters and interest. Auto-suggest may be used for the query based on interest. For example, a query may be to find a female who has twin boys and who is interested in eco-related products. The system may then at 804 search for the interest included in the query by filtering the interests stored in the database using the queried interest. The system may, if desired, rank users by interest as at 806, and present the requested results to the user as at 808. Or collections from users with the particular interest may be similarly filtered and presented to the user in ranked order, if desired. FIG. 8A illustrates the method discussed with respect to FIG. 8. FIG. 8A illustrates at 850 at least a part of a user interface at a client machine, for the user who is seeking a recommendation. As discussed above, the user may add the query that indicates the information the user is looking for. In this case in the "User," area, indicating the type of person the querying user is seeking, the querying user enters Female as at 852. At the space 854 indicating the children or number of children desired by the query, the querying user may enter "Twin Boys." Then, at space 856 indicating the product desired, the querying user may enter "eco-friendly." Taken in sum, the querying user is looking for recommendations for eco-friendly products, the recommendations made by females who have twin boys.

Figure 8B:
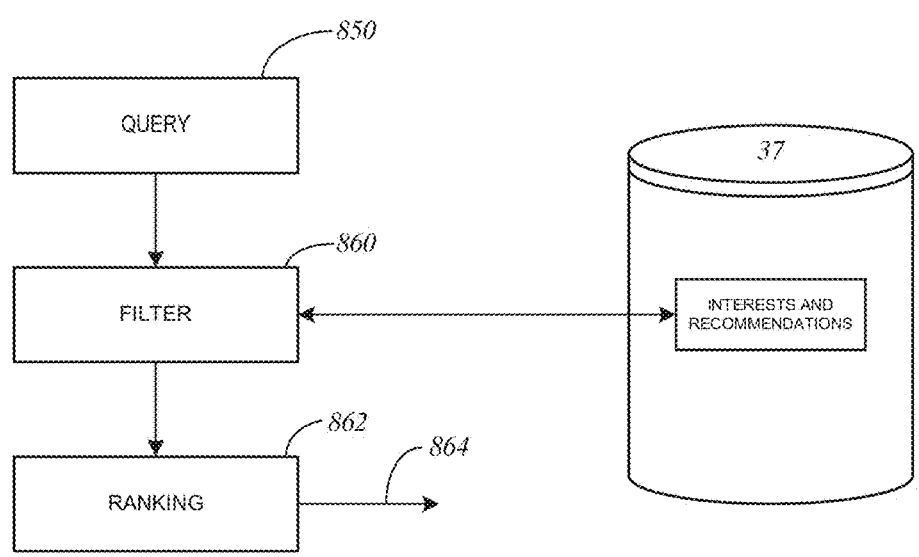

FIG. 8B illustrates retrieving of the queried recommendation or recommendations. At 850, which is the user interface illustrated in FIG. 8A, the query is sent to a filter, which may be a comparator 860.

As previously discussed, the interests of registered users may be stored in the Interests area of database 37. The database is accessed and provides interests to filter 860 which filters the interests to find recommendations for eco-friendly products from females with twin boys. The results may be ranked in ranking apparatus 862 which may rank the results by any desired ranking. For example, the ranking may be based on the number of followers for the particular females with twin boys who recommend eco-friendly products. Those of ordinary skill in the art will be able to design other ranking schemes.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It may be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
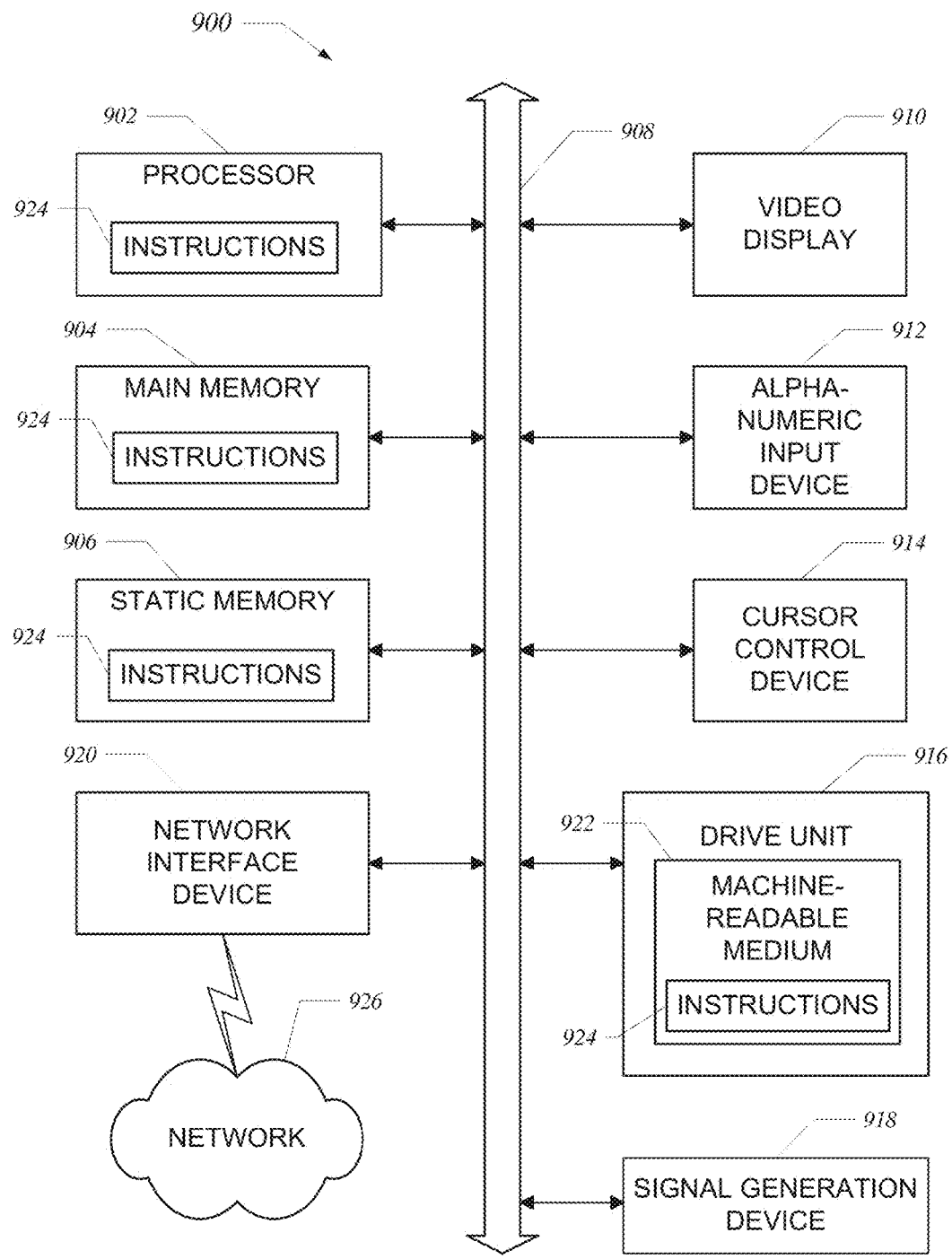
FIG. 9 is a block diagram illustrating components of a machine, according to some example embodiments, able to read instructions from a machine-readable medium and perform any one or more of the methodologies discussed herein.

FIG. 9 is a block diagram of machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the described implementations, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computer implemented method comprising:

determining, for each user of a first plurality of users, information, the first plurality of users including a first user, the information including first information associated with the first user, the first information indicating a first user interest of the first user, the first user interest including a plurality of friends, the first information further including collections of products created by the first user and being categorized in product categories named by the first user, the first information further including a first product recommendation authored by the first user for a first product included in a first collection of products, the first collection of products being included in the collections of products created by the first user, the determining using at least one computer processor;

tabulating the determined information for each user of the first plurality of users including the first user;

storing the tabulated and determined information for each user of the first plurality of users, including the first user, in a database;

receiving a query, over a network, from a second user via a first user interface, the query being received from a client machine, the query requesting at least one recommendation from the first plurality of users in accordance with a user interest of each user of the first plurality of users being common to a user interest of the second user, the user interest of the second user being the plurality of friends;

filtering the stored tabulated information to determine product recommendations, the filtering being responsive to the receiving the query, the filtering being based on a user interest of each user of the first plurality of users being common to the user interest of the second user being the plurality of friends, the product recommendations including the first product recommendation;

presenting, over the network, via a second user interface at least a portion of the product recommendations comprising a first set of visible user interface elements including a first portion of the set of visible user interface elements, the first portion of the set of visible user interface elements being presented as selectable recommendations being provided by the first plurality of users who have the user interest common to the user interest of the second user being the plurality of common friends, the selectable recommendations including the first product recommendation authored by the first user, the second portion of the set of visible user interface elements being presented as non-selectable user interface elements:

receiving, over the network, via the second user interface, a selection of one of the selectable recommendations; and responsive to the receiving of the selection, presenting, over the network via a third user interface, a second set of visible user interface elements presenting the first collection of products.

2. The computer implemented method of claim 1, wherein the first user interest comprises at least one of user personal information and user activities.

3. The computer implemented method of claim 1, wherein the product recommendations are ranked.

4. The computer implemented method of claim 3, wherein the first plurality of users collect products or services and the ranking is based on friends the second user is following on a social network, friends that are following the second user on the social network, or collections the second user is following on the social network.

5. The computer implemented method of claim 1, wherein products or services are collected using a bookmarklet.

6. The computer implemented method of claim 5, wherein attributes of the products or services comprise a user interest.

7. The method of claim 1 wherein the common interest is determined from user profiles or from user activity.

8. A machine-readable hardware memory device having embedded therein a set of instructions which, when executed by the machine, causes the machine to execute operations comprising:

determining, for a first plurality of users, individually, information, the first plurality of users including a first user, the information including first information associated with the first user, the first information indicating a first user interest of the first user, the first user interest including a plurality of friends, the first information further including collections of products created by the first user and being categorized in product categories named by the first user, the first information further including a first product recommendation authored by the first user for a first product included in a first collection of products, the first collection of products being included in the collections of products created by the first user;

tabulating the determined information for each user of the first plurality of users including the first user;

storing the tabulated and determined information for each user of the first plurality of users, including the first user, in a database;

receiving a query, over a network, from a second user via a first user interface, the query being received from a client machine, the query requesting at least one recommendation from the first plurality of users in accordance with a user interest of each user of the first plurality of users being common to a user interest of the second user, the user interest of the second user being the plurality of friends;

filtering the stored tabulated information to determine product recommendations, the filtering being responsive to the receiving the query, the filtering being based on a user interest of each user of the first plurality of users being common to the user interest of the second user being the plurality of friends, the product recommendations including the first product recommendation;

presenting, over the network, via a second user interface at least a portion of the product recommendations comprising a first set of visible user interface elements, the first set of visible user interface elements including a first portion of the set of visible user interface elements, the first portion of the set of visible user interface elements being presented as selectable recommendations being provided by the first plurality of users who have the user interest common to the user interest of the second user being the plurality of common friends, the selectable recommendations including the first product recommendation authored by the first user, the second portion of the set of visible user interface elements being presented as non-selectable user interface elements:

receiving, over the network, via the second user interface, a selection of one of the selectable recommendations; and responsive to the receiving of the selection, presenting, over the network via a third user interface, a second set of visible user interface elements presenting the first collection of products.

9. The machine-readable hardware memory device of claim 8, wherein the first user interest comprises at least one of user personal information and user activities.

10. The machine-readable hardware memory device of claim 8, wherein the product recommendations are ranked.

11. The machine-readable hardware memory device of claim 10, wherein a first user collects products or services and the ranking is based on friends the first user is following on a social network, friends that are following the first user on the social network, or collections the first user is following on the social network.

12. The machine-readable hardware memory device of claim 8, wherein products or services are collected using a bookmarklet.

13. The machine-readable hardware memory device of claim 12, wherein attributes of the products or services comprise a user interest.

14. The machine-readable hardware memory device of claim 8, wherein the common interest is determined from user profiles or from user activity.

15. A system comprising:

at least one processor and executable instructions accessible on a computer-readable medium that, when executed, cause the at least one processor to perform operations comprising:

determining, for each user of a first plurality of users, information, indicating a user interest of the first plurality of users and collections of products made by the first plurality of users, the collections of products being categorized in product categories named by the first plurality of users, each user of the first plurality of users providing product recommendations:

tabulating the determined information for each user of the first plurality of users;

storing the tabulated and, determined information for each user of the plurality of users, including the first user, in a database;

receiving a query, over a network, from a second user via a first user interface, the query being received from a client machine, the query requesting at least one recommendation from the first plurality of users in accordance with a user interest of each user of the first plurality of a users being common to user interest of the second user, the user interest of the second user being the plurality of friends;

filtering the stored tabulated information to determine product recommendations, the filtering being responsive to the receiving the query, the filtering being based on a user interest each user of the first plurality of users being common to the user interest of the second user being the plurality of friends, the product recommendations including the first product recommendation;

presenting, over the network, via a second user interface at least a portion of the product recommendations comprising a first set of visible user interface elements including a first portion of the set of visible user interface elements, the first portion of the set of visible user interface elements being presented as selectable recommendations being provided by the first plurality of users who have the user interest common to the user interest of the second user being the plurality of common friends, the selectable recommendations including the first product recommendation authored by the first user the second portion of the set of visible user interface elements being presented as non-selectable user interface elements;

receiving, over the receiving the second user interface, a selection of one of the selectable recommendations; and responsive to the receiving of the selection, presenting, over the network via a third user interface, a second set of visible user interface elements presenting the first collection of products.

16. The system of claim 15, wherein the first user interest comprises at least one of user personal information and user activities.

17. The system of claim 15, wherein the product recommendations are ranked.

18. The system of claim 17, wherein the first plurality of users collect products or services and the ranking is based on friends the second user is following on a social network, friends that are following the second user on the social network, or collections of products the second user is following on the social network.

19. The system of claim 15, wherein products or services are collected using a bookmarklet and attributes of the products or services comprise a user interest.

20. The system of claim 15, wherein the common interest is determined from user profiles or from user activity.

* * * * *

UNITED STATES PATENT AND TRADEMARK OFFICE
CERTIFICATE OF CORRECTION

PATENT NO. : 10,198,486 B2  
APPLICATION NO. : 13/539379  
DATED : February 5, 2019  
INVENTOR(S) : Edward O'Neil Garcia et al.

Page 1 of 1

It is certified that error appears in the above-identified patent and that said Letters Patent is hereby corrected as shown below:

In the Claims

In Column 15, Line 3, in Claim 1, delete "elements:" and insert -- elements; --, therefor.

In Column 15, Line 27, in Claim 7, delete "claim 1" and insert -- claim 1, --, therefor.

In Column 16, Line 15, in Claim 8, delete "elements:" and insert -- elements; --, therefor.

In Column 16, Line 54, in Claim 15, delete "recommendations:" and insert -- recommendations; --, therefor.

In Column 16, Line 57, in Claim 15, delete "and," and insert -- and --, therefor.

In Column 16, Line 65, in Claim 15, delete "a users" and insert -- users --, therefor.

In Column 16, Line 65, in Claim 15, after "to" insert -- a --.

In Column 17, Line 21, in Claim 15, delete "receiving" and insert -- network, via --, therefor.

Signed and Sealed this  
Nineteenth Day of January, 2021

Andrei Iancu  
*Director of the United States Patent and Trademark Office*